(12) United States Patent
Felix et al.

(10) Patent No.: US 11,119,559 B2
(45) Date of Patent: Sep. 14, 2021

(54) CONTROLLING A PROCESSOR CLOCK

(71) Applicant: Graphcore Limited, Bristol (GB)

(72) Inventors: Stephen Felix, Bristol (GB); Mrudula Gore, Bath (GB)

(73) Assignee: GRAPHCORE LIMITED, Bristol (GB)

( * ) Notice: Subject to any disclaimer, the term of this patent is extended or adjusted under 35 U.S.C. 154(b) by 82 days.

(21) Appl. No.: 16/428,797

(22) Filed: May 31, 2019

(65) Prior Publication Data
US 2020/0201412 A1    Jun. 25, 2020

(30) Foreign Application Priority Data

Dec. 21, 2018 (GB) ..................................... 1821064

(51) Int. Cl.
| | |
|---|---|
| G06F 1/324 | (2019.01) |
| G06F 1/06 | (2006.01) |
| G06F 1/08 | (2006.01) |
| G06F 1/3206 | (2019.01) |

(52) U.S. Cl.
CPC ................ *G06F 1/324* (2013.01); *G06F 1/06* (2013.01); *G06F 1/08* (2013.01); *G06F 1/3206* (2013.01)

(58) Field of Classification Search
CPC .......... G06F 1/324; G06F 1/3206; G06F 1/08; G06F 1/06
USPC ........................................ 713/322, 501, 600
See application file for complete search history.

(56) References Cited

U.S. PATENT DOCUMENTS

| | | | | |
|---|---|---|---|---|
| 5,844,435 | A * | 12/1998 | Grundvig ................ | G06F 1/324 327/151 |
| 7,231,537 | B2 * | 6/2007 | Nobunaga ............ | G11C 7/1027 713/400 |
| 2005/0138444 | A1 * | 6/2005 | Gaskins ................ | G06F 1/3203 713/300 |
| 2005/0182983 | A1 | 8/2005 | Gaskins | |
| 2010/0185878 | A1 | 7/2010 | Rozen | |
| 2013/0120037 | A1 * | 5/2013 | Tripathi .................... | G06F 1/08 327/156 |
| 2014/0173321 | A1 * | 6/2014 | Dobbs ..................... | H03L 7/085 713/400 |

(Continued)

FOREIGN PATENT DOCUMENTS

CN         1054285898 A         11/2015

OTHER PUBLICATIONS

Combined Search and Examination Report for United Kingdom Patent Application No. GB1821064.1 dated Sep. 30, 2019.

*Primary Examiner* — Ji H Bae
(74) *Attorney, Agent, or Firm* — Haynes and Boone, LLP

(57) ABSTRACT

There is disclosed a method of controlling the frequency of a clock signal in a processor. The method selects a first clock generator to provide a processor clock signal for executing an application. If a threshold event is detected, a second clock generator is selected. The method reduces the frequency of a clock signal generated by the first clock generator while a processor clock signal is being provided for execution of an application from the second clock generator. The second clock generator generates a clock at a lower speed than the first clock generator. After a predetermined time the first clock generator is reselected to provide the processor clock signal. The threshold detection is repeated until an optimum clock frequency is discovered.

41 Claims, 5 Drawing Sheets

(56) References Cited

U.S. PATENT DOCUMENTS

2016/0218721 A1* 7/2016 Herbeck .................. G06F 1/08
2016/0294374 A1* 10/2016 Gemma ................. G06F 1/324

* cited by examiner

CONTROLLING A PROCESSOR CLOCK

CROSS-REFERENCE TO RELATED APPLICATIONS

The present application claims priority to United Kingdom Patent Application No. 1821064.1, filed Dec. 21, 2018, of which is hereby incorporated by reference in its entirety as if fully set forth below and for all applicable purposes.

TECHNICAL FIELD

The present disclosure relates to controlling a processor clock. Particularly but not exclusively, the present disclosure relates to controlling a processor clock by selecting an optimum frequency for a processor clock signal which is controlling the timing of applications executed on a processor.

BACKGROUND

When executing an application on a processor there are many different variables which may affect the performance of the processor when executing that application. These variables may include the voltage at which the processor is running, the current drawn by the processor, the temperature of the processor and the execution frequency of one or more applications controlled by a processor clock signal. There are many contexts in which these variables become interdependent. This makes selecting an optimum frequency of a processor clock signal at which any particular application is to be executed very challenging. For any given processor, different applications may perform differently and therefore it may not be straightforward to set a processor clock signal frequency which is intended to govern all applications run on a particular processor. Some processors might be intended to run a very wide variety of different applications with widely differing power demands. Furthermore, there are two potentially opposing challenges. On the one hand, there is a general desire not to "waste power". The faster a processor clock runs (the greater the frequency of the clock signal), the more power will be consumed by the application. On the other hand, processors are increasingly being built with a capacity to run "hot", that is, with high-power budgets. The faster the processor clock runs, the more efficiently a particular application can be executed and deliver its output. This is particularly the case for processors which act as accelerators for processing the demanding workloads in artificial intelligence/machine learning applications. Thus, efficiency would dictate as fast a processor clock as possible. However, remaining within a set power budget which might be allocated for some or all of the applications to be executed on the processor could dictate a lower frequency.

SUMMARY

The present disclosure effectively addresses the trade-off between the need for efficiency in executing demanding workloads in processors acting as accelerators for example, and not exceeding power budgets.

A first aspect of the present invention is directed towards a method of controlling the frequency of a clock signal in a processor comprising: selecting a first clock generator to provide a processor clock signal for executing an application; detecting a threshold event indicating that the application has exceeded a power budget allocated for its execution; selecting a second clock generator to provide the processor clock signal for executing the application, wherein the frequency of the processor clock signal provided by the second clock generator is less than the frequency of the processor clock signal provided by the first clock generator; reducing the frequency of a clock signal generated by the first clock generator while the processor clock signal is being provided from the second clock generator; and after a predetermined time from selecting the second clock generator, reselecting the first clock generator to provide the processor clock signal.

Factors which determine the performance of a processor executing a particular application may comprise four main factors. The processor frequency of a processor's clock signal is one of these four main factors. The other three may include: the voltage at which the processor is running, the current drawn by the processor, and the temperature of the processor. These four main factors can, in various combinations and in various contexts, become interdependent to various extents. Therefore, selecting an optimum processor clock signal frequency is paramount to optimising the efficiency of a processor executing a particular application. The present disclosure concerns the trade-off between increased frequency corresponding to increased speed of execution of an application and the limits of each application's power budgets.

In embodiments, the aforementioned step of reducing the frequency of the clock signal generated by the first clock generator may reduce the frequency by a predetermined amount during the predetermined time. This predetermined amount may be between 1% and 5% of a starting value of the frequency of the clock signal generated by the first clock generator. The start value of the frequency of the processor clock signal generated by the first clock generator may be between 1 GHz and 1.6 GHz.

In embodiments, the frequency of the clock signal generated by the second clock generator may be constant during execution of the application and this frequency may be a fraction, optionally 50%, of the frequency of the clock signal generated by the first clock generator. This value of the frequency of the clock signal generated by the second clock generator may be in the range of substantially 500 MHz to substantially 800 MHz. Other ranges and values are possible.

In embodiments, the aforementioned step of detecting the threshold event may detect that a current drawn by the processor in executing the application has exceeded a current threshold set based on the power budget.

In embodiments, the aforementioned step of selecting the second clock generator may comprise detecting that a selection value has been written into a register of the processor. Selecting the second clock generator may be carried out responsive to detection that an alert signal has been asserted at a detection input of the processor and responsive to that detection the second clock generator is selected but the frequency of the clock signal generated by the first clock generator is not yet reduced at that point, such that when the first clock generator is reselected the processor clock signal is at the same clock frequency as it was before the second clock generator was selected. When the frequency of the clock signal generated by the first clock generator is reduced, the step may comprise adjusting configuration settings of the first clock generator via an adjustment input. Alternatively, or in addition, the step of reducing the frequency of the clock signal generated by the first clock generator may comprise waiting for the predetermined time for the reduced clock frequency to stabilise. In embodiments, the alert responsive to detecting the threshold event may be asserted while the application exceeds its power budget and for a fixed delay thereafter, after which it is de-asserted.

In embodiments, after a time period at least an order of magnitude greater than the predetermined time, the frequency of the clock signal generated by the first clock generator may be increased to a value above a start value to determine whether the application can be executed at a processor clock frequency higher than the start value.

A second aspect of the present invention is directed towards a computer system comprising: a first clock generator configured to generate a first clock signal; a second clock generator configured to generate a second clock signal which has a frequency lower than that of the first clock signal; switching circuitry configured to select one of the first and second clock signals to serve as a processor clock signal for the execution of at least one application on a processor; monitoring circuitry configured to detect a threshold event indicating that the application has exceeded a power budget allocated for its execution; and a controller responsive to detection of the threshold event to reduce the frequency of the first clock signal and to control the switch to select the second clock signal to serve as the processor clock while the frequency of the first clock signal is reduced.

In embodiments, the first and/or the second clock generator of the computer system may each be implemented as a phase locked loop. The first clock generator may have an adjustment input selectable by the controller to adjust the frequency of the clock signal generated by the first clock generator. The frequency of the clock signal output by the second clock generator may be maintained at a constant value for the period of execution of the application.

In embodiments, the computer system may comprise a logic gate having a first input configured to receive from the monitoring circuitry an alert which is asserted to indicate detection of the threshold event, and a second input configured to receive a value determined or generated by the controller, the logic circuitry being such that the second clock generator is selected if either of the first or second input is asserted. The value determined or generated by the controller may be written into a register.

In embodiments, the monitor of the computer system may comprise a power management integrated circuit. The monitor of the computer system may additionally or alternatively comprise an ammeter. The aforementioned threshold event may comprise an over current event indicating that the processor is drawing a current in excess of a current threshold when executing the application.

In embodiments, the switching circuitry comprises a multiplexor, preferably a glitch free multiplexor, having first and second inputs connected respectively to outputs of the first and second clock generators, and an output which provides the processor clock signal.

A further aspect of the present invention is directed towards a clock controller for controlling the frequency of a clock signal in a processor, the clock controller comprising: a clock adjustment output configured to provide a clock adjustment signal for adjusting the frequency of a first clock generator of a processor; a throttling output configured to select a second clock generator to provide a processor clock while the frequency of the first clock generator is adjusted; wherein the throttle output is asserted for a predetermined time to select the second clock generator and wherein the output frequency of the first clock generator is adjusted by a predetermined amount; an input to receive an alert responsive to detection of a threshold event indicating that the application has exceeded a power budget allocated for its execution; and a processor configured to detect the alert, to assert the signal for selecting the second clock generator and to generate an adjustment signal on the adjustment output for adjusting the first clock generator.

In embodiments, the controller may comprise a two-way connection configured to connect the controller to a power management chip, wherein the controller is configured to supply a power budget to the power management chip and to receive the alert from a monitor on the power management chip.

For a better understanding of the present invention and to show how the same may be carried into effect reference will now be made by way of example to the accompanying drawings.

DETAILED DESCRIPTION

Figure 1:
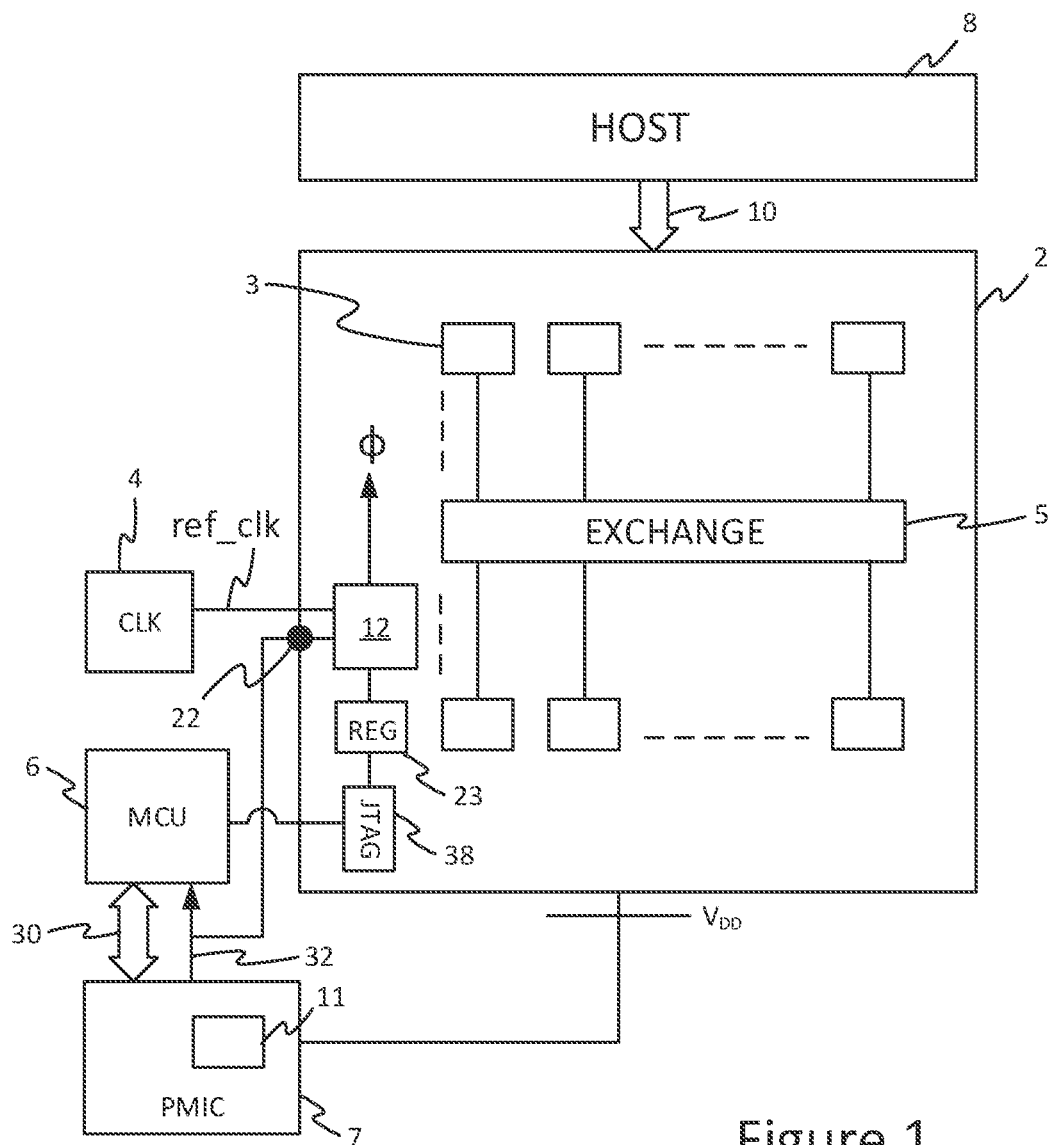
FIG. 1 is a schematic block diagram of a processor with a clock control system.

FIG. 1 is a schematic block diagram of a computer system which comprises a processor 2 which may be for example a single chip processor comprising multiple processing units sometimes referred to herein as tiles 3. The processor 2 is clocked by a clock 4 which provides a reference clock ref_clk at a base clock frequency to the processor 2. Note that the term "clocked" may be alternatively termed as "controlled". The word clock used herein is used to denote a clock signal at a certain frequency. The terms "clock frequency" and "clock signal frequency" may be interchanged. The processor 2 is connected to a management control unit (MCU) module 6, which could be implemented on or off the same chip as the processor. The MCU 6 manages multiple services of the processor 2 and in the present context controls the frequency of a clock signal which governs operation of the tiles 3 on the processor 2. Operation of the tiles is understood to mean any operation of any active tiles, including, not exclusively, executing local programs forming part of an application executed on the processor. A power management integrated circuit (PMIC) 7 provides power to the processor 2 through a supply voltage rail labelled VDD, and is connected to the MCU via a two-way serial bus 30 and an interrupt pin 32. The interrupt pin may take the form of one or more physical wire. The processor 2 may be an accelerator which is used to process workloads allocated to it by a host 8. Note that the terms application and workload are used interchangeably herein. In some cases an application may be preloaded onto a chip and workload data supplied from the host. The host 8 can supply workload data for being executed to the processor 2 via an interface 10. The accelerator may be a single processor 2, or multiple processors connected on a card. There may be multiple cards connected in a rack, for example a server rack. The processors may be of the type, known as an intelligence processor unit (IPU), which are designed to deal with workloads in the field of artificial intelligence or machine learning. The clock 4 may serve one processor or multiple processors. The clock 4 may supply the reference clock ref_clk to an on-chip clock generator module 12 via a card connector (not shown) or similar. The on-chip clock generator module 12 generates a processor clock signal Φ which is supplied to the processing units 3 on the processor 2. The physical clock lines supplying each processing unit are not shown in FIG. 1 to avoid overcomplicating the diagram. Note that other parts of the processor for example an exchange 5 which enables controls inter-tile communication on the chip may be clocked by the clock signal Φ or by the reference clock ref_clk or by some other clock (not shown).

As an alternative to the clock being supplied via a card connector or similar, there may be an "on-board" clock source. That is, the clock 4 may be implemented within the processor 2. The clock signal from the clock source 4 is the reference clock ref_clk from which the clock signal Φ for the operation of the processing units is derived. A system clock for some aspects on the chip logic (not shown) could also be derived from the reference clock ref_clk.

In accordance with embodiments of the invention the clock generator module 12 receives the reference clock ref_clk signal and generates the processor clock signal Φ as described herein. The processor clock signal is alternatively referred to herein as the IPU clock signal Φ.

Figure 2:
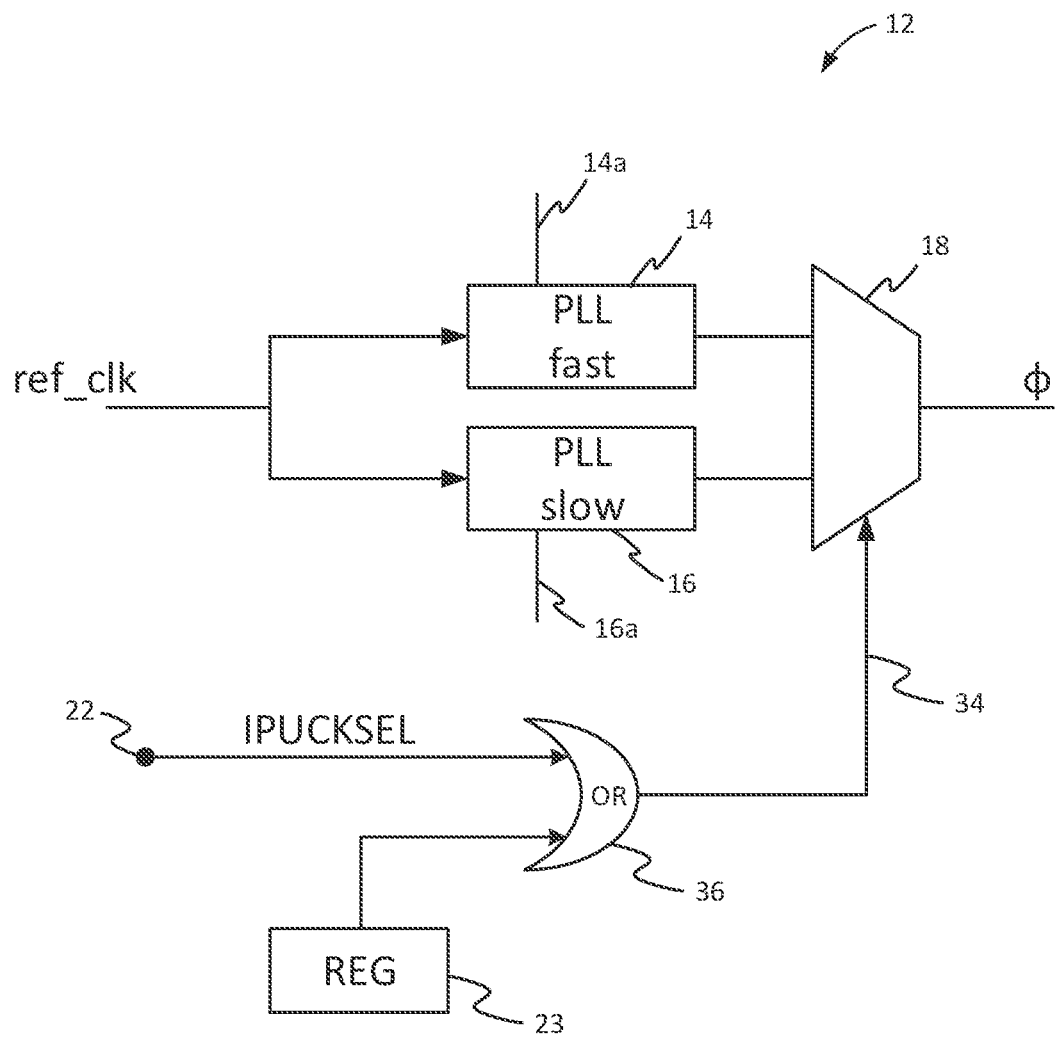
FIG. 2 is a schematic block diagram of a clock generator module.

The on-chip clock generator module 12 receives an input from an IPU clock selection pad 22 which is connected to the interrupt pin 32 of the PMIC 7. It also receives a value from an on chip register 23, which can be written to via an interface 38 by the MCU 6. The interface may be JTAG interface. The clock generator module 12 comprises two phase locked loops (PLLs) 14, 16 which are shown in FIG. 2. Each PLL 12, 14 receives the reference clock ref_clk. A first one of the PLLs 14 ("fast" PLL) generates a so-called fast clock from the reference clock ref_clk, and a second one of the PLLs 16 ("slow" PLL) generates a so-called slow clock from ref_clk. A glitch free multiplexer 18 receives the outputs from the PLLs 14, 16 and can switch between the fast clock and the slow clock to provide the IPU clock signal Φ. The multiplexer 18 is controlled by a multiplexer control signal 34 which is the output of an OR gate 36 which is also shown as forming part of the clock generator module 12. The multiplexer may be a glitch free multiplexor. It will be appreciated that while the clock generator module 12 is described as comprising the various above circuits, these circuits (PLLs, OR gate, multiplexor, register) need not be located in the same particular block but could be distributed in the chip. The clock generator module 12 is described therefore as a convenient way of explaining how embodiments of the invention operate to control generation of the IPU clock Φ. The clock generator module is alternatively referred to herein as a controller. One input of the OR gate 36 is connected to the IPU clock selection pad 22 which is connected to the interrupt pin 32 of the PMIC 7 via a physical wire or wires which permit the PMIC 7 to control the state of the clock selection pad 22. A signal which can be asserted on the line connecting the interrupt pin to the clock selection pad 22 is labelled IPUCKSEL (as a shorthand for IPU clock selection). As will be described in more detail later, when this signal is asserted at a predetermined logic value, the output of the slow PLL 16 is selected to provide the IPU clock Φ, and when it is not asserted, IPU clock Φ depends on the state of the other input to the OR gate 36. The other input to the OR gate 36 is derived from the register 23 which can store an indication written into it by the MCU 6. When a predetermined logic value ("1" in the embodiment) is stored in the register 23, this causes the state of the multiplexor control signal 34 to be asserted and thus, to select the output of the slow PLL 16 as the IPU clock Φ. When the opposite logic value ("0" in the embodiment) is stored in the register 23, the state of the multiplexor control signal 34 depends on the IPUCKSEL signal. As a consequence, by operation of the OR gate, when either the IPUCKSEL signal on the clock selection pad 22 is asserted, or the value in the register 23 achieves the predetermined logic state, the multiplexer 18 selects the output of the slow PLL 16 as the IPU clock Φ. Conversely, the output of the fast PLL 14 is selected if the clock selection pad is not asserted and the register has the opposite logic value (not the predetermined logic state).

As described in one embodiment, the clock selection pad 22 is asserted high to control the multiplexer 18 to select the output of the slow PLL 16, and is not asserted (low) in the opposite condition. Of course, it is possible to use an opposite protocol, where the clock selection pad 22 would be asserted low to select the output of the slow PLL, and would be high in the opposite condition. Similarly, the logic values in the register 23 could be reversed—"0" to assert the slow clock and "1" to de-assert the slow clock. Other logic values (one or more bits) could be used to denote an assert or deassert condition.

The fast PLL 14 is intended to supply, for most of normal workload processing operations of the processor 2, the IPU clock Φ which clocks (controls) the processing operations of the processing units 3 on the processor 2. The slow PLL 16 may be considered as a system PLL because it can be used for various start-up and system tasks.

The slow PLL 16 also performs an additional function herein, which is to supply the IPU clock Φ while an optimum frequency for the fast clock from the fast PLL 14 is being discovered. As an example, the output of the slow PLL 16, the slow clock, could be in the range of 25 MHz to 1 GHz, and the output of the fast PLL 14, the fast clock could be in the range of 25 MHz to 1.6 GHz. Based on the foregoing, clock frequency ranges, it is evident that these ranges encompass scenarios when the fast and slow clocks may produce outputs at the same speed. That is not the intended operation in the embodiment described herein. In particular, non limiting embodiments, the slow clock could be in the range 500 MHz to 800 MHz. The fast clock could be in the range 1 GHz to 1.6 GHz. The intended operation is that the output from the fast PLL 14 is "faster" (i.e. runs at a higher clock frequency) than the output of the slow PLL 16. In some embodiments, the frequency of the output of the fast PLL 14 might be twice the frequency of the output of the slow PLL 16. For example, the frequency of the output of the fast PLL 14 could be 1.6 GHz, and the frequency of the output of the slow PLL 16 could be 800 MHz. Many different specific frequencies and frequency ratios can be utilised within the concepts of the present invention. The output of the fast PLL 14 could run at a different multiple of the output of the slow PLL for example, and the frequency of the output of the slow PLL may be set differently for different purposes. What is important, however, is the manner by which the slow PLL and the fast PLL have their clock frequencies set, as will be described further herein.

As is known in the art, the frequency of clock signals generated by PLLs can be adapted by adapting the configuration settings of the PLL. There are many different types of PLL and the adaption may be performed in many different ways, which are known in the art. In one example, a divider setting may be altered which affects the manner in which a supply voltage to the PLL is divided and which therefore causes the PLL to "lock" onto a different clock frequency. When adjusting a PLL, different kinds of PLL have different "lock" times. The "lock" time is the time taken by the PLL to change from one stable output frequency to a different stable output frequency in response to an adaption signal that is being applied. In FIG. 2, reference numeral 14a denotes the adaptation signal for the fast PLL, and reference numeral 16a denotes the adaption signal for the slow PLL. The fast and slow PLLs may be of the same or different types.

The frequency of the output (or output frequency) operation of the processor encompasses operation of the tiles as well as on-chip logic and other system functions. of the slow PLL 16 is set according to a power budget allocated for operation of the processor in a particular context as determined by the host 8. This is described in more detail later. Once the output frequency of the slow PLL 16 has been set for the particular context, its output frequency remains constant for that particular context. For example, it may remain constant to process certain workloads, or for a certain extended period of time or until the allocation of a new power budget. Generally, it is the intention to set the output frequency of the from the slow PLL 16 during start-up or booting of the chip and only change it when there is a change in the context of operation of the chip. The frequency of the slow clock is selected by operation of the MCU through the interface 38. It is set up at the beginning of operation of the chip and is thereafter not changed on the fly in normal circumstances.

By contrast, the discovery of the frequency of the output of the fast PLL 14 can be carried out dynamically while the processor is running a particular application in the manner to be described. The purpose of altering the frequency of the output of the fast PLL 14 is to try and ascertain (discover) relatively quickly the maximum frequency at which an application can operate without exceeding an allocated power budget to the chip. This is achieved as described in the following.

A power budget is set for a particular application or workload which is to be executed by the processor 2. In some embodiments the power budget is set by the host and conveyed to the MCU (via the processor 2 or directly via another means, not shown), although other possibilities exist. For example, the MCU 6 may be aware of previous similar applications run for that particular chip embodying the processor and may be able to set the power budget based on power budget historical data which has been stored. In any event, the MCU 6 has an understanding of the power budget. Where there are multiple chips on a card, the MCU mayl determine for each chip what the power budget for that chip is to be. When running applications in the field of machine learning and artificial intelligence, the demands which are placed on processing requirements for the chip imply that a power budget should be reached but not exceeded. That is, the aim is to run the chip as "hot" as is possible within the constraints of the power budget. The MCU 6 determines, based on the power budget, a current threshold to be managed by the PMIC 7. In some embodiments, the PMIC 7 supplies a constant supply voltage VDD (for example, 0.8 Volts) to the supply voltage rail of the processor 2, such that the current threshold can be derived by dividing the power budget by the supply voltage VDD. In other situation, there may be complex calculations required to determine the current threshold which is to be used by the PMIC 7. The PMIC 7 comprises an ammeter 11 or other kind of sensor which is capable of detecting when the current threshold has been exceeded by current drawn by the processor 2. The PMIC 7 is appropriately connected to the processor 2 to measure the current, although these connections are not shown in FIG. 1. The current is the current which is being drawn by the processor 2 to execute the application or workload. The current threshold determined by the MCU 6 is communicated to the PMIC 7 over a serial bus 30 which connects the MCU 6 to the PMIC 7, and is stored in a memory (not shown) of the PMIC 7. As described in the following, a threshold event is a detected by the PMIC if the current drawn by the processor 2 exceeds a threshold value representing the current threshold. On the occurrence of such a threshold event, an alert is asserted on the interrupt pin 32 to indicate to the MCU 6 that a threshold event has occurred. The MCU 6 manages the interrupt pin 32 with an interrupt protocol. One consequence of this is discussed later, but before doing so the principles of discovery of the fast clock speed (output frequency of the fast PLL 14) will now be laid out.

Figure 3:
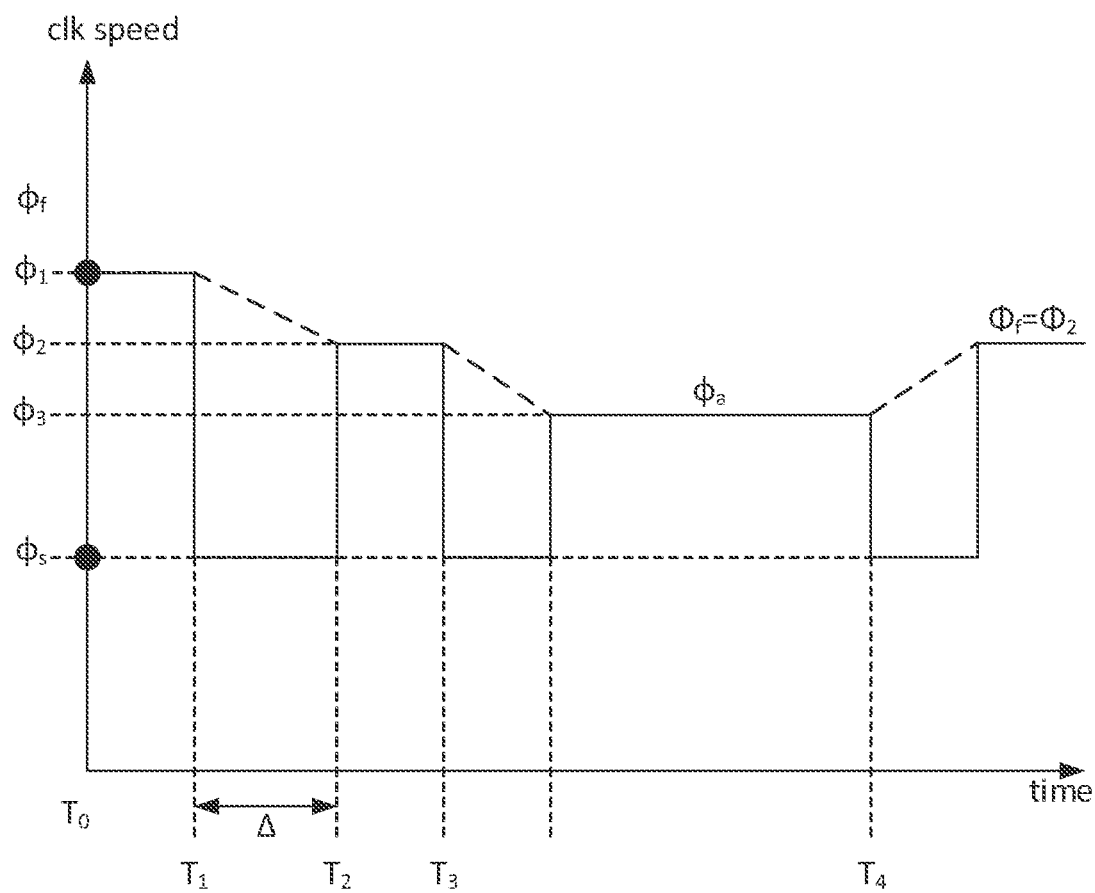
FIG. 3 is a timing diagram illustrating adjustment of a 'fast' clock.

FIG. 3 illustrates the manner in which the first PLL 14 is dynamically controlled to deliver the IPU clock $\Phi$ based on the power budget. At time T0 when the application is started, the output of the fast PLL 14 is supplied at a first (start) clock frequency $\Phi_1$ to the processing units 3 on the processor as shown by the full line between T0 and T1 in FIG. 3. If the clock frequency is too high, the current drawn by the processor 2 will exceed the current threshold. Time T1 denotes such an over-current event which is indicated by the PMIC 7 and which indicates that the clock at the start clock frequency is too high to run that application within the allocated power budget. The multiplexer 18 is controlled (as described later), to select the output $\Phi_s$ of the slow PLL 16 as the clock signal to be supplied to the processing units in place of $\Phi_1$ for a time period $\Delta$. During that time period $\Delta$, settings in the fast PLL 14 may be adjusted by the adjustment input 14a under the control of the MCU 6 to reduce the speed of the output of the fast PLL 14 to a lower value $\Phi_2$ as indicated by the dotted line commencing at time T1 in FIG. 3. The multiplexer 18 is controlled (as described later) to reselect the output of the fast PLL 14 at time T2 to run the application at frequency $\Phi_2$. At time T3, again, an over-current event is detected and the steps are repeated. Eventually, the application runs without the detection of over-current events at a frequency labelled $\Phi_a$ in FIG. 3. $\Phi_a$ is the discovered application clock frequency. That frequency $\Phi_a$ may be stored in association with the application so that the next time that the application is executed the optimum clock frequency can be set on commencement of the application. The next time workloads for that application are provided to the processor 2, an appropriate setting for the fast PLL 14 can be looked up which delivers the clock at the optimum frequency (as adjusted at the adjustment input 14a) for that application. However, the discovery process should be relatively quick, such that storage of the discovered frequencies may not be needed. Note that by this process the optimum frequency is the fastest frequency at which the IPU clock $\Phi$ can run without over-current events. Note that the terms "speed" and "frequency" may be used interchangeably when referring to clock signals.

Note that in the period in which the application is running on the slower clock $\Phi_s$, it is of course running slowly, but it is not failing completely. Moreover, it is sure to remain within the power budget if the speed of the slow PLL has been properly set at the outset.

Moreover, the time periods $\Delta$ for which the application is running on the slow clock may be very short. The time periods $\Delta$ are set based on the time which it takes for the fast PLL 14 to stabilise at the new clock frequency. This can be related to the "lock" time of the PLL. In some embodiments this is of the order of tens of microseconds, for example in the range of 10-100 Ms. One example may be 20 microseconds.

The process by which the multiplexer 18 is controlled to switch the output delivered as IPU clock Φ from the fast PLL 14 to the slow PLL 16 at an overcurrent event will now be described. There are two mechanisms. The first mechanism involves the handling of the interrupt on the interrupt pin 32 by the MCU 6. In handling of the interrupt, the MCU writes a "1" into the register 23 such that (even if the IPUCKSEL signal at the clock selection pad 22 becomes deasserted), the multiplexer 18 is still controlled to have the application controlled by the slow PLL 16. The MCU 6 (via the JTAG interface 38) controls the fast PLL 14 through the adaption signal 14a to adjust the PLL settings to reduce the frequency of the output clock from the fast PLL, as shown in FIG. 3.

Although FIG. 3 shows relatively large decreases of the clock frequency (for clarity of illustration), in fact these decreases can be very small (of the order of 1 to 2% of the maximum clock frequency), which might be typically orders of magnitude between 12 and 25 Hertz. These are relatively small steps compared with the absolute frequency (which might be of the order of 1 GHz as discussed earlier). After a period of time allowing for the fast PLL to stabilise (Δ in FIG. 3) the MCU 6 changes the status of the "1" in the register 23 and (assuming the alert on the interrupt pin 32 is not asserted), the output IPU clock Φ of the multiplexer 18 is selected to be the output of the fast PLL 14. It will be appreciated that the first mechanism involving the MCU writing to the register 23 is adequate by itself and adjusting the clock frequency enables the clock discovery process to be implementable. However, the interrupt attention time of the MCU 6 cannot be guaranteed. There are circumstances in which it can be important to quickly "throttle back" to the slow clock to avoid exceeding the power budget. Throttling back within 10 microseconds can be needed in some circumstances. To achieve this, a second mechanism is provided in some embodiments.

Figure 4:
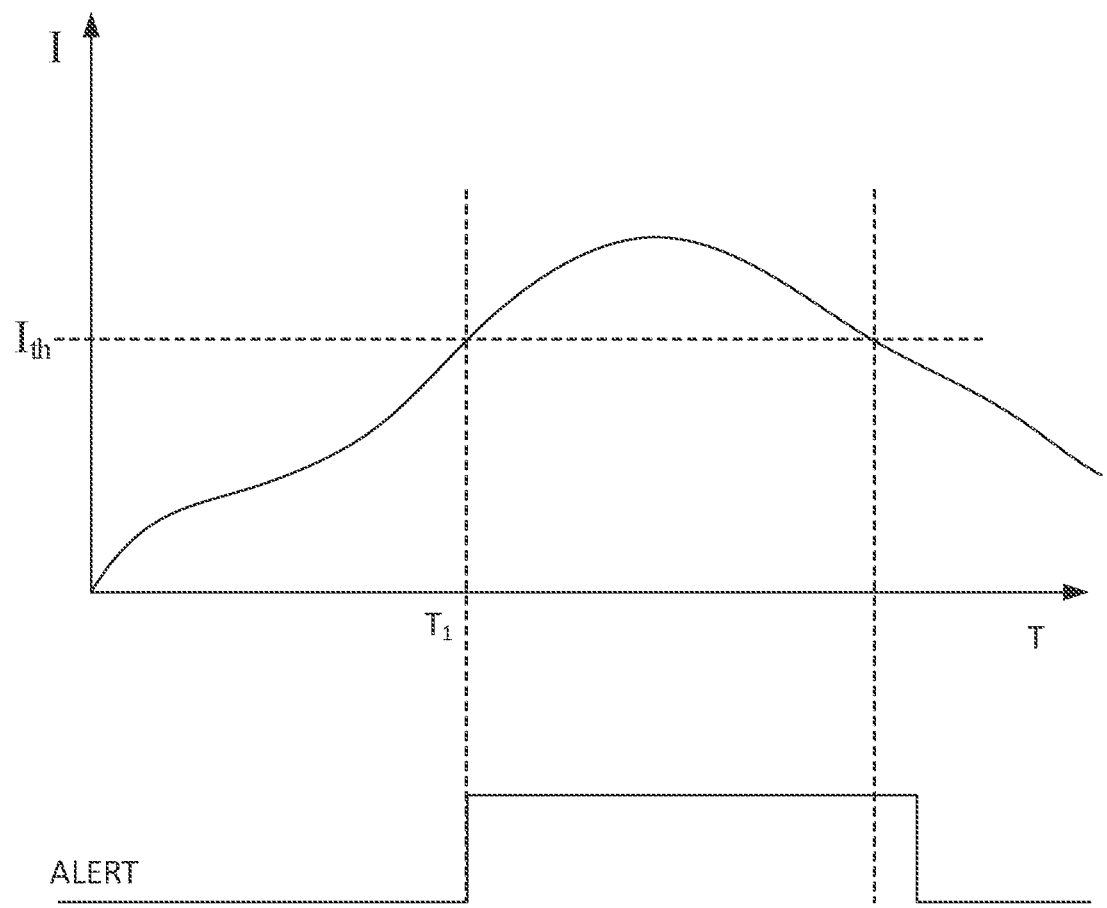
FIG. 4 is a schematic diagram illustrating assertion of an alert on detection of a threshold event.

According to the second mechanism the alert which is asserted on the interrupt pin 32 to the MCU 6 is also supplied to the clock selection pad 22 which feeds one input of the OR gate 36. This provides an immediate "throttling back" in the event of detection that the current has exceeded a current threshold. This has been referred to as an over current event or threshold event, such terms being interchangeable. By using an alert hard wired directly to the clock selection pad 22, it can be guaranteed that the application moves to operate on a slower clock as soon as the threshold event is seen. Thus, if it takes the MCU 6 some time to respond (due for example to interrupt handling latency), the power budget is nevertheless respected. FIG. 4 shows the relationship between the current and the alert raised by PMIC 7. Figure shows the graph of current I versus time T. The current is the current drawn by the processor 2 as measured by the ammeter 11 in the PMIC 7. A threshold value for the current Ith has been set by the MCU 6 as described earlier. At time T1, the overcurrent event is detected as the current exceeds the threshold. At this time the alert is set on the interrupt pin 32. In reality this alert may be set a very short time after the over-current event to allow for logic processing in the PMIC 7. Note, however that the alert does not de-assert immediately when the current falls below the threshold. Instead, the interrupt pin 32 remains asserted to select the output of the slow PLL 16 for a short period after the current has dropped below the threshold. This period may be programmable, and can avoid the level of the pin repeatedly changing due to the interrupt handling time of the MCU 6. After that short period of time, it is de-asserted. Note that alternatives are possible, for example a sticky flag could retain the alert until it is cleared.

If at that stage, the MCU 6 has not set a "1" into the register 23, the output of the fast PLL 14 will be reasserted as at time T2 in FIG. 3. Note that with this mechanism in place it does not necessarily matter if the MCU 6 takes some time to respond to the over-current event. However, what will happen is that the fast PLL is reasserted at its original fast speed $\Phi_1$, presumably an over-current event will again be detected (because the clock is too fast for the current power budget), and the alert mechanism will respond again to select the output of the slow PLL 16. So there might be some iterations between outputs of the fast and slow PLLs, while the fast PLL is not adjusted to slow down its speed. Nevertheless, the power budget is maintained and the application continues to operate. Once the MCU 6 gets round to processing the interrupt, it will adapt the speed of the fast PLL as described earlier.

There may be a change in circumstances such that the discovered (current) frequency $\Phi_a$ which is discovered for the application may not represent the fastest possible frequency at which that application could be run. Therefore, in some embodiments the MCU 6 can periodically attempt to discover a higher frequency. FIG. 3 shows a time point T4 which is after a time period at least an order of magnitude greater than the time delay Δ which is used to adjust the first clock. If those time periods are of the order of tens of microseconds, time T4 may be at a point around 100 milliseconds. At this point, the controller operates to select the output of the slow PLL 16 and to increase the frequency of the output of the fast PLL to a value $\Phi_f$ which is higher than the current frequency Φ. For example, $\Phi_f$ could be the preceding step value $\Phi_2$. In some cases, the value $\Phi_f$ could be above the start frequency $\Phi_1$. Then, the discovery process which has been described above and which occurred at times T0 to T3 et cetera will begin again to see whether or not that higher frequency can be maintained, or to discover a frequency between $\Phi_1$ and $\Phi_f$.

Figure 5:
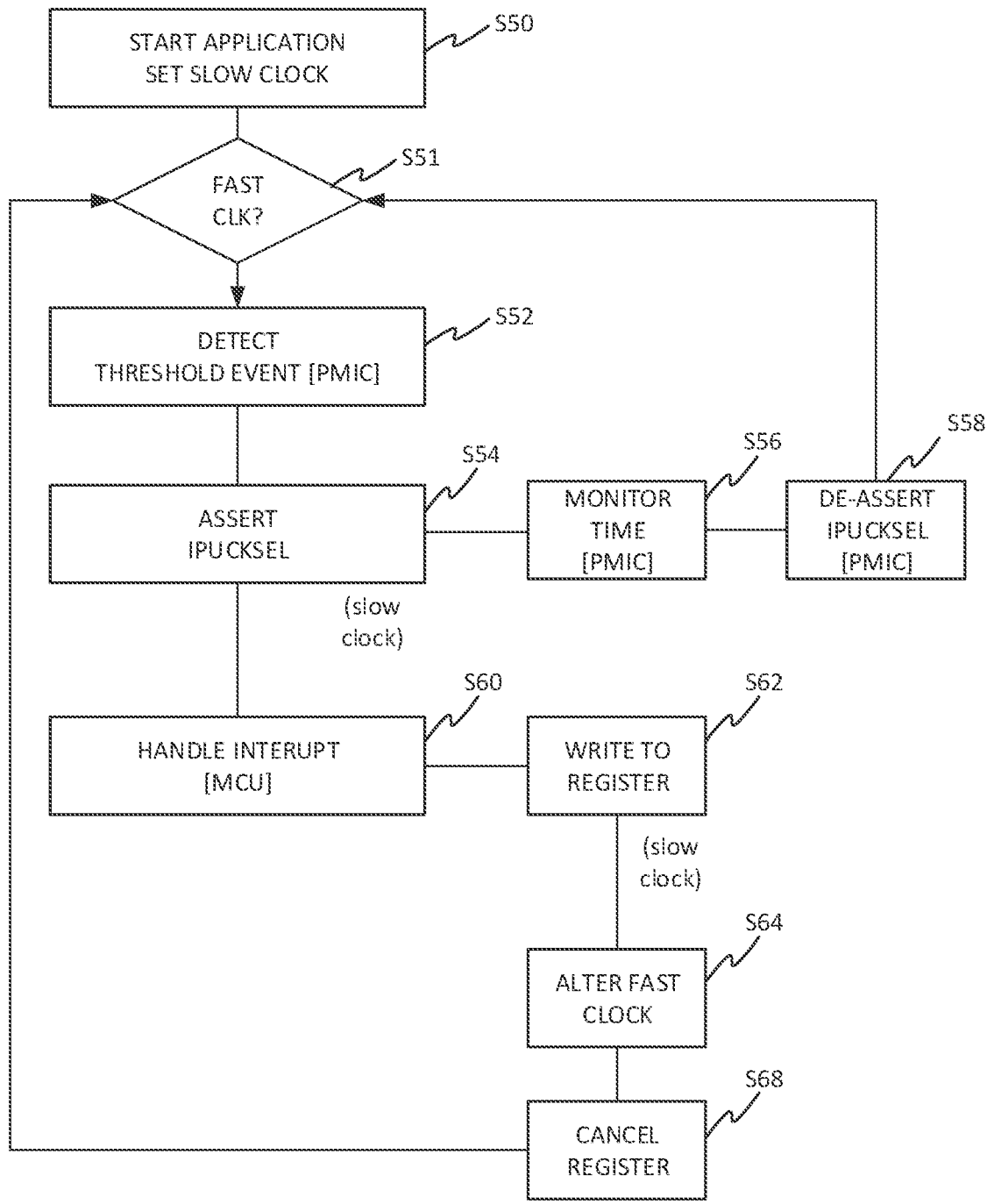
FIG. 5 is a flowchart illustrating a method of clock control.

Reference will now be made to FIG. 5 which is a flowchart illustrating a clock control process described herein. At step S 50 an application is started at a certain start fast clock frequency $\Phi_1$. Prior to that or at the same time the frequency of the output of the slow PLL 16 is set, which is intended to be constant while the application is executed. Step S 51 does not represent a method step in the flow, but schematically illustrates the state of the multiplexer 18 in that the output of the fast PLL 14 is selected as the processor clock Φ if the IPU clock selection signal IPUCKSEL is deasserted and the value in the register 23 is (according to the logic described above) at logic value "0". Assuming that the processor is running on the output of the fast PLL 14 the following steps take place. At step S 52, the PMIC 7 detects a threshold event and asserts an alert on the IPU clock selection pad 22 (step S 54). This causes the output of the slow PLL 16 to be selected. The PMIC 7 monitors the time for which the alert should be asserted at step S 56, and deasserts the alert after that time period at step S 58. This de-asserts the IPU clock selection pad 22 which acts as input to the OR gate 36 and the multiplexer 18 selects the output of the fast PLL as the IPU clock Φ unless the register value in register 23 is written to a "1". The loop of S 51, S52, S54, S56 and S58 might occur more than once until the MCU 6 gets round to handling the interrupt on pin 32. Step S60 denotes the step point at which the MCU 6 handles the interrupt. According to the interrupt handling sequence, at step S 62 the value of "1" is written to the register 23. This will ensure that the output of the slow PLL 16 is selected while the MCU alters the frequency of the output of the fast PLL 14 at step S 64. Once that has been done (time period Δ FIG. 3), the value in the register 23 is cancelled (written to a "0") and this deasserts the second input to the OR gate 36. The two mechanisms in this flow ensure that even if the MCU exhibits latency in handling the interrupt, nevertheless the processor clock will switch between the fast and slow clocks in such a way as not to exceed the power budget. However, in some embodiments the interrupt handling sequence by itself is effective to discover the fastest IPU clock frequency within a particular power budget.

While particular embodiments have been described, other applications and variants of the disclosed techniques may become apparent to a person skilled in the art once given the disclosure herein.

The invention claimed is:

1. A method of clock signal control in a processor, the method comprising:
    selecting a first clock generator, the first clock generator configured to generate a first clock signal, to provide a processor clock signal for executing an application;
    detecting a threshold event indicating that the application has exceeded a power budget allocated for its execution;
    selecting a second clock generator, the second clock generator configured to generate a second clock signal, to provide the processor clock signal for executing the application, wherein the frequency of the processor clock signal provided by the second clock generator is less than the frequency of the processor clock signal provided by the first clock generator;
    reducing the frequency of a the first clock signal generated by the first clock generator while the processor clock signal is being provided from the second clock generator; and
    after a predetermined time from selecting the second clock generator, reselecting the first clock generator to provide the processor clock signal, wherein the step of reducing the frequency of the first clock signal includes reducing the frequency by a predetermined amount during the predetermined time, and wherein the predetermined amount is between 1% and 5% of a starting value of the frequency of the first clock signal generated by the first clock generator.

2. The method as claimed in claim 1 wherein a start value of the frequency of the first clock signal generated by the first clock generator is between 1 GHz and 1.6 GHz.

3. The method according to claim 1 wherein the frequency of the second clock signal generated by the second clock generator is constant during execution of the application.

4. The method according to claim 1 wherein the frequency of the second clock signal generated by the second clock generator is a fraction of the frequency of the first clock signal generated by the first clock generator.

5. The method according to claim 1 wherein selecting the second clock generator comprises detecting that a selection value has been written into a register of the processor.

6. The method according to claim 1 wherein reducing the frequency of the first clock signal generated by the first clock generator comprises adjusting configuration settings of the first clock generator via an adjustment input.

7. A computer system comprising:
    a first clock generator configured to generate a first clock signal;
    a second clock generator configured to generate a second clock signal which has a frequency lower than that of the first clock signal;
    switching circuitry configured to provide either the first clock signal or the second clock signal to a processor;
    monitoring circuitry configured to detect a threshold event indicating that an application running on the processor has exceeded a power budget; and
    controlling circuitry configured to, responsive to detection of the threshold event, cause the first clock generator to reduce the frequency of the first clock signal and to cause the switching circuitry to provide the second clock signal to the processor while the frequency of the first clock signal is reduced, wherein a start value of the frequency of the first clock signal generated by the first clock generator is between 1 GHz and 1.6 GHz.

8. The computer system according to claim 7 wherein the first or the second clock generator is implemented as a phase locked loop.

9. The computer system according to claim 7 wherein the first clock generator has an adjustment input selectable by the controlling circuitry to adjust the frequency of the first clock signal.

10. The computer system according to claim 7 wherein the frequency of the second clock signal is maintained at a constant value for a period of execution of the application.

11. The computer system according to claim 7 comprising a logic gate having:
    a first input configured to receive from the monitoring circuitry an alert which is asserted to indicate detection of the threshold event, and
    a second input configured to receive a value determined by the controlling circuitry, the logic gate being such that the second clock generator is selected if either of the first or second input is asserted.

12. The computer system according to claim 7 comprising a register into which a value is written by the controlling circuitry.

13. The computer system according to claim 7 wherein the monitoring circuitry comprises a power management integrated circuit.

14. The computer system according to claim 7 wherein the monitoring circuitry comprises an ammeter and wherein the threshold event comprises an over current event indicating that the processor is drawing a current in excess of a current threshold when executing the application.

15. The computer system according to claim 7 wherein the switching circuitry comprises a multiplexor having first and second inputs connected respectively to outputs of the first and second clock generators.

16. A non-transitory machine readable medium having stored thereon instructions for performing a method comprising machine executable code which when executed by a processor, causes the processor to:
    receive an alert indicating a power budget threshold is exceeded by an application executing at a first operating frequency according to a processor clock received from a first clock generator;
    generate a clock adjustment signal to adjust the first clock generator in response to the alert;
    select a second clock generator to provide the processor clock during a first time in which the first clock generator is adjusted;
    after the first time has elapsed, select the first clock generator to provide the processor clock at a second operating frequency lower than the first operating frequency; and after a second time has elapsed without the power budget threshold being exceeded, adjust the first clock generator to a third operating frequency, which is between the first operating frequency and the second operating frequency.

17. The non-transitory machine readable medium as claimed in claim 16, wherein the machine executable code further causes the processor to:
select the second clock generator to provide the processor clock during the second time.

18. A method comprising:
receiving an alert indicating a power budget threshold is exceeded by an application executing at a first operating frequency according to a processor clock received from a first clock generator;
generating a clock adjustment signal to adjust the first clock generator in response to the alert;
selecting a second clock generator to provide the processor clock during a first time in which the first clock generator is adjusted;
after the first time has elapsed, selecting the first clock generator to provide the processor clock at a second operating frequency lower than the first operating frequency; and
after a second time has elapsed without the power budget threshold being exceeded, adjusting the first clock generator to a third operating frequency, which is between the first operating frequency and the second operating frequency.

19. The method of claim 18, further comprising: selecting the second clock generator to provide the processor clock during the second time.

20. The method of claim 18, wherein the alert is asserted while the application exceeds its power budget threshold and for a fixed delay thereafter.

21. A method of clock signal control in a processor, the method comprising:
selecting a first clock generator, the first clock generator configured to generate a first clock signal, to provide a processor clock signal for executing an application;
detecting a threshold event indicating that the application has exceeded a power budget allocated for its execution;
selecting a second clock generator, the second clock generator configured to generate a second clock signal, to provide the processor clock signal for executing the application, wherein the frequency of the processor clock signal provided by the second clock generator is less than the frequency of the processor clock signal provided by the first clock generator;
reducing the frequency of a the first clock signal generated by the first clock generator while the processor clock signal is being provided from the second clock generator; and
after a predetermined time from selecting the second clock generator, reselecting the first clock generator to provide the processor clock signal;
wherein reducing the frequency of the first clock signal generated by the first clock generator includes waiting for the predetermined time for the reduced clock frequency to stabilise.

22. The method according to claim 21 wherein reducing the frequency of the first clock signal generated by the first clock generator reduces the frequency by a predetermined amount during the predetermined time.

23. The method according to claim 21, wherein the frequency of the second clock signal generated by the second clock generator is constant during execution of the application.

24. The method according to claim 21, wherein the frequency of the second clock signal generated by the second clock generator is a fraction of the frequency of the first clock signal generated by the first clock generator.

25. The method according to claim 21, wherein selecting the second clock generator comprises detecting that a selection value has been written into a register of the processor.

26. The method according to claim 21, wherein reducing the frequency of the first clock signal generated by the first clock generator comprises adjusting configuration settings of the first clock generator via an adjustment input.

27. A method of clock signal control in a processor, the method comprising:
selecting a first clock generator, the first clock generator configured to generate a first clock signal, to provide a processor clock signal for executing an application;
detecting a threshold event indicating that the application has exceeded a power budget allocated for its execution;
selecting a second clock generator, the second clock generator configured to generate a second clock signal, to provide the processor clock signal for executing the application, wherein the frequency of the processor clock signal provided by the second clock generator is less than the frequency of the processor clock signal provided by the first clock generator;
reducing the frequency of the first clock signal generated by the first clock generator while the processor clock signal is being provided from the second clock generator; and
after a predetermined time from selecting the second clock generator, reselecting the first clock generator to provide the processor clock signal, wherein detecting the threshold event includes detecting that a current drawn by the processor in executing the application has exceeded a current threshold set based on the power budget.

28. The method according to claim 27 wherein reducing the frequency of the first clock signal generated by the first clock generator reduces the frequency by a predetermined amount during the predetermined time.

29. The method according to claim 27, wherein the frequency of the second clock signal generated by the second clock generator is constant during execution of the application.

30. The method according to claim 27, wherein the frequency of the second clock signal generated by the second clock generator is a fraction of the frequency of the first clock signal generated by the first clock generator.

31. The method according to claim 27, wherein selecting the second clock generator comprises detecting that a selection value has been written into a register of the processor.

32. The method according to claim 27, wherein reducing the frequency of the first clock signal generated by the first clock generator comprises adjusting configuration settings of the first clock generator via an adjustment input.

33. A method of clock signal control in a processor, the method comprising:
selecting a first clock generator, the first clock generator configured to generate a first clock signal, to provide a processor clock signal for executing an application;

detecting a threshold event indicating that the application has exceeded a power budget allocated for its execution;

selecting a second clock generator, the second clock generator configured to generate a second clock signal, to provide the processor clock signal for executing the application, wherein the frequency of the processor clock signal provided by the second clock generator is less than the frequency of the processor clock signal provided by the first clock generator;

initiating a reduction of the frequency of the first clock signal generated by the first clock generator while the processor clock signal is being provided from the second clock generator; and after a predetermined time from selecting the second clock generator, reselecting the first clock generator to provide the processor clock signal, wherein selecting the second clock generator is carried out responsive to detection that an alert signal has been asserted at a detection input of the processor, and wherein reselecting the first clock generator is carried out before the frequency of the first clock signal generated by the first clock generator is reduced, such that when the first clock generator is reselected the processor clock signal is at the same clock frequency as it was before the second clock generator was selected.

34. The method according to claim 33 further comprising asserting the alert signal responsive to detecting the threshold event, the alert signal being asserted while the application exceeds its power budget and for a fixed delay thereafter, after which it is de-asserted.

35. A method of clock signal control in a processor, the method comprising:

selecting a first clock generator, the first clock generator configured to generate a first clock signal, to provide a processor clock signal for executing an application;

detecting a threshold event indicating that the application has exceeded a power budget allocated for its execution;

selecting a second clock generator, the second clock generator configured to generate a second clock signal, to provide the processor clock signal for executing the application, wherein the frequency of the processor clock signal provided by the second clock generator is less than the frequency of the processor clock signal provided by the first clock generator;

reducing the frequency of the first clock signal generated by the first clock generator while the processor clock signal is being provided from the second clock generator;

after a predetermined time from selecting the second clock generator, reselecting the first clock generator to provide the processor clock signal; and after a time period at least an order of magnitude greater than the predetermined time, increasing the frequency of the first clock signal generated by the first clock generator to a higher value to determine whether the application can be executed at a higher processor clock frequency.

36. The method according to claim 35 wherein reducing the frequency of the first clock signal generated by the first clock generator reduces the frequency by a predetermined amount during the predetermined time.

37. The method according to claim 35, wherein the frequency of the second clock signal generated by the second clock generator is constant during execution of the application.

38. The method according to claim 35, wherein the frequency of the second clock signal generated by the second clock generator is a fraction of the frequency of the first clock signal generated by the first clock generator.

39. The method according to claim 35, wherein selecting the second clock generator comprises detecting that a selection value has been written into a register of the processor.

40. The method according to claim 35, wherein reducing the frequency of the first clock signal generated by the first clock generator comprises adjusting configuration settings of the first clock generator via an adjustment input.

41. A method of clock signal control in a processor, the method comprising:

selecting a first clock generator, the first clock generator configured to generate a first clock signal, to provide a processor clock signal for executing an application;

detecting a threshold event indicating that the application has exceeded a power budget allocated for its execution;

selecting a second clock generator, the second clock generator configured to generate a second clock signal, to provide the processor clock signal for executing the application, wherein the frequency of the processor clock signal provided by the second clock generator is less than the frequency of the processor clock signal provided by the first clock generator;

reducing the frequency of a the first clock signal generated by the first clock generator while the processor clock signal is being provided from the second clock generator; and after a predetermined time from selecting the second clock generator, reselecting the first clock generator to provide the processor clock signal, wherein the frequency of the second clock signal generated by the second clock generator is in the range of 500 MHz to 800 MHz.

* * * * *